United States Patent
Yu et al.

(10) Patent No.: US 12,000,442 B2
(45) Date of Patent: Jun. 4, 2024

(54) CONTROL METHOD OF ELECTROMAGNETIC CLUTCH IN HYBRID POWER SYSTEM AND HYBRID POWER SYSTEM

(71) Applicant: Jing-Jin Electric Technologies Co., Ltd., Beijing (CN)

(72) Inventors: Ping Yu, Beijing (CN); Jianwen Li, Beijing (CN); Yang Cao, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 201 days.

(21) Appl. No.: 17/768,118

(22) PCT Filed: May 6, 2021

(86) PCT No.: PCT/CN2021/091829
§ 371 (c)(1),
(2) Date: Apr. 11, 2022

(87) PCT Pub. No.: WO2022/193418
PCT Pub. Date: Sep. 22, 2022

(65) Prior Publication Data
US 2023/0349430 A1 Nov. 2, 2023

(30) Foreign Application Priority Data
Mar. 18, 2021 (CN) .......................... 202110292817.0

(51) Int. Cl.
*F16D 48/06* (2006.01)
*B60K 6/387* (2007.10)
(Continued)

(52) U.S. Cl.
CPC ............ *F16D 48/064* (2013.01); *B60K 6/387* (2013.01); *B60W 20/50* (2013.01); *B60R 16/033* (2013.01);
(Continued)

(58) Field of Classification Search
CPC ......... F16D 48/064; F16D 2500/10412; F16D 2500/30401; F16D 2500/3108;
(Continued)

(56) References Cited

U.S. PATENT DOCUMENTS

2015/0260239 A1 9/2015 Hayakawa et al.
2015/0300428 A1 10/2015 David et al.

FOREIGN PATENT DOCUMENTS

CN 103085733 A 5/2013
CN 103148120 A * 6/2013 ............. F16D 27/14
(Continued)

OTHER PUBLICATIONS

First Office Action issued in Chinese Patent Application No. 202110292817 dated Apr. 24, 2022.
(Continued)

*Primary Examiner* — Huan Le
(74) *Attorney, Agent, or Firm* — Fox Rothschild LLP; Carol Thorstad-Forsyth

(57) ABSTRACT

A hybrid power system comprises an engine, a motor, an electromagnetic clutch, an electromagnetic clutch controller and a power supply system. The power supply system comprises: a low-voltage battery, a standby power supply system and a switching circuit. The electromagnetic clutch is used to control connection of the motor. A control method comprises: monitoring whether a voltage of the low-voltage battery is lower than a target value, and judging whether the low-voltage battery fails; using the switching circuit to switch to the standby power supply system to supply power
(Continued)

to the electromagnetic clutch and the electromagnetic clutch controller; using the electromagnetic clutch controller to judge an engaged or disengaged state of the electromagnetic clutch; and further controlling the electromagnetic clutch according to the engaged or disengaged state. When the low-voltage battery power supply fails, the switching circuit switches to the standby power supply system to supply power.

10 Claims, 3 Drawing Sheets

(51) Int. Cl.
  *B60W 20/50* (2016.01)
  *B60R 16/033* (2006.01)
(52) U.S. Cl.
  CPC .............. *B60W 2554/4042* (2020.02); *B60W 2710/022* (2013.01); *F16D 2500/10412* (2013.01); *F16D 2500/30401* (2013.01); *F16D 2500/3108* (2013.01); *F16D 2500/3166* (2013.01); *F16D 2500/70422* (2013.01)
(58) Field of Classification Search
  CPC ... F16D 2500/3166; F16D 2500/70422; B60K 6/387; B60W 20/50; B60W 2520/10; B60W 2710/022; B60R 16/033
  See application file for complete search history.

(56) References Cited

FOREIGN PATENT DOCUMENTS

| CN | 106740589 A | 5/2017 |
|----|-------------|--------|
| CN | 108068608 A | 5/2018 |
| CN | 108657157 A | 10/2018 |
| CN | 208461538 U | 2/2019 |
| CN | 109416122 A | 3/2019 |
| CN | 110667381 A | 1/2020 |
| CN | 112145576 A | 12/2020 |
| CN | 112319306 A | 2/2021 |
| EP | 0449280 A1 | 10/1991 |
| EP | 2570284 A1 | 3/2013 |
| JP | 2005020854 | 1/2005 |
| JP | 2017229132 A | 12/2017 |
| JP | 2020114156 | 7/2020 |
| WO | 2007054051 A2 | 5/2007 |

OTHER PUBLICATIONS

International Search Report mailed in PCT/CN2021/091829 dated Nov. 19, 2021.
Supplementary European Search Report dated Nov. 21, 2022 in corresponding European Patent Application No. 21857008.3 (4 pages).
Notice of Reasons for Refusal with English Translation for Japanese Patent Application No. 2022-578948 dated Dec. 25, 2023 (11 pages).

* cited by examiner

CONTROL METHOD OF ELECTROMAGNETIC CLUTCH IN HYBRID POWER SYSTEM AND HYBRID POWER SYSTEM

CROSS-REFERENCE TO RELATED APPLICATIONS

The present application is the U.S. National Phase of International Patent Application No. PCT/CN2021/091829, filed on May 6, 2021, which claims priority to Chinese Patent Application No. 202110292817.0, filed on Mar. 18, 2021. The contents of these applications are incorporated herein by reference in their entireties.

TECHNICAL FIELD

The present disclosure belongs to the technical field of electromagnetic clutch control, in particular to a control method of electromagnetic clutch in hybrid power system and a hybrid power system.

BACKGROUND

As a core component of power source split of hybrid electric vehicle, the electromagnetic clutch is critical to the power performance and output capacity of hybrid power system. At present, the power source split units of many hybrid power systems do not have a control strategy for clutch voltage failure. Once the power supply battery or harness fails and there is no other power supply to provide electric energy, the electromagnetic clutch controller will not work normally, which will lead to the decline of the safety and reliability of the whole vehicle power system, and even the failure of the whole vehicle.

Normally for a typical electromagnetic clutch, if the low-voltage battery lost, the clutch will be defaulted to open, the power system or drive unit will lose part or all of power. The consequence of this situation is that the vehicle will break down on the way. It is a very dangerous situation that should be avoided.

SUMMARY

In view of the above problems, the present disclosure discloses a control method of an electromagnetic clutch in a hybrid system and a hybrid system to overcome the above problems or at least partially solve the above problems.

In order to achieve the above object, the present disclosure adopts the following technical solutions.

An aspect of the present disclosure provides a control method of a bi-stable electromagnetic clutch in a hybrid power system, the hybrid power system further comprises an engine or motor, a motor, an electromagnetic clutch controller and a power supply system; the power supply system comprises a low-voltage battery, a standby power supply system and a switching circuit, the bi-stable electromagnetic clutch is used to control connection of the motor, wherein the control method specifically comprises the following steps:

step 1, monitoring whether a voltage of the low-voltage battery is lower than a target value, and judging whether the low-voltage battery fails;

step 2, when the low-voltage battery fails, using the switching circuit to switch to the standby power supply system to supply power to the electromagnetic clutch and the electromagnetic clutch controller;

step 3, using the electromagnetic clutch controller to judge an engaged or disengaged state of the electromagnetic clutch; and step 4, further controlling the electromagnetic clutch, by the electromagnetic clutch controller, according to the engaged or disengaged state.

Further, the step 4 specifically comprises:

when the electromagnetic clutch is in the engaged state, maintaining the engaged state; and when the electromagnetic clutch is in the disengaged state, judging whether it is necessary to send a command of electromagnetic clutch engagement according to a vehicle speed signal.

Further, judging whether it is necessary to send the command of electromagnetic clutch engagement according to the vehicle speed signal comprises:

judging whether the vehicle speed signal can be detected;

if the vehicle speed signal can be detected, judging whether it is necessary to send the command of electromagnetic clutch engagement according to a vehicle speed;

when the vehicle speed signal cannot be detected, sending the command of electromagnetic clutch engagement after a preset time period.

Further, judging whether it is necessary to send the command of electromagnetic clutch engagement according to the vehicle speed comprises:

when the vehicle speed is greater than a preset value, not sending the command of electromagnetic clutch engagement;

when the driving speed is less than or equal to the preset value, sending the command of electromagnetic clutch engagement.

Further, the control method further comprises:

step 5, when a monitored voltage of the low-voltage battery is not lower than the target value, switching to the low-voltage battery, by the switching circuit, to supply power to the electromagnetic clutch and the electromagnetic clutch controller.

Further, the electromagnetic clutch is a bi-stable electromagnetic split clutch.

Further, the bi-stable electromagnetic split clutch comprises a fixed member, a moving member and an elastic member;

the fixed member comprises a ferromagnetic element, and windings are disposed on the ferromagnetic element;

the moving member comprises an armature disk, and a plurality of permanent magnetic steels are disposed on the armature disk.

Further, the standby power supply system comprises a high-voltage battery, a voltage transformation circuit and a capacitor module;

the high-voltage battery is connected to the switching circuit through the voltage transformation circuit; one end of the capacitor module is connected to a connecting line between the voltage transformation circuit and the switching circuit, and the other end of the capacitor module is grounded;

the voltage transformation circuit is a flyback switching power supply circuit for transforming a high voltage to a low voltage.

Further, the standby power supply system further comprises a charging circuit; the charging circuit is connected to an output end of the voltage transformation circuit, and the one end of the capacitor module is connected to a connecting line between the charging circuit and the switching circuit.

Another aspect of the present disclosure also provides a hybrid power system, preferably a vehicle hybrid power system, which adopts the control methods as stated above.

The advantages and beneficial effects of the present disclosure are as follows.

Normally for a typical electromagnetic clutch, if the low-voltage battery lost, the clutch will be defaulted to open, the power system or drive unit will lose part or all of power. The consequence of this situation is that the vehicle will break down on the way. It is a very dangerous situation that should be avoided.

In the control method of the electromagnetic clutch according to the present disclosure, when the power supply of the low-voltage battery of the whole vehicle fails and the normal operation of the electromagnetic clutch controller and the electromagnetic clutch cannot be ensured, the switching circuit switches to the standby power supply system to supply power to the electromagnetic clutch controller and the electromagnetic clutch, which provides guarantee for the use of the electromagnetic clutch. Moreover, in the control method, the electromagnetic clutch is always engaged when the low-voltage battery fails, so that the vehicle is driven by hybrid power, which ensures the safety and reliability of hybrid power system.

BRIEF DESCRIPTION OF DRAWINGS

By reading the detailed description of the preferred embodiments below, various other advantages and benefits will become clear to a person of ordinary skill in the art. The drawings are only used for the purpose of illustrating the preferred embodiments, and should not be considered as a limitation to the present disclosure. Moreover, throughout the drawings, the same reference numerals are used to denote the same components. In the drawings.

DETAILED DESCRIPTION

Figure 1:
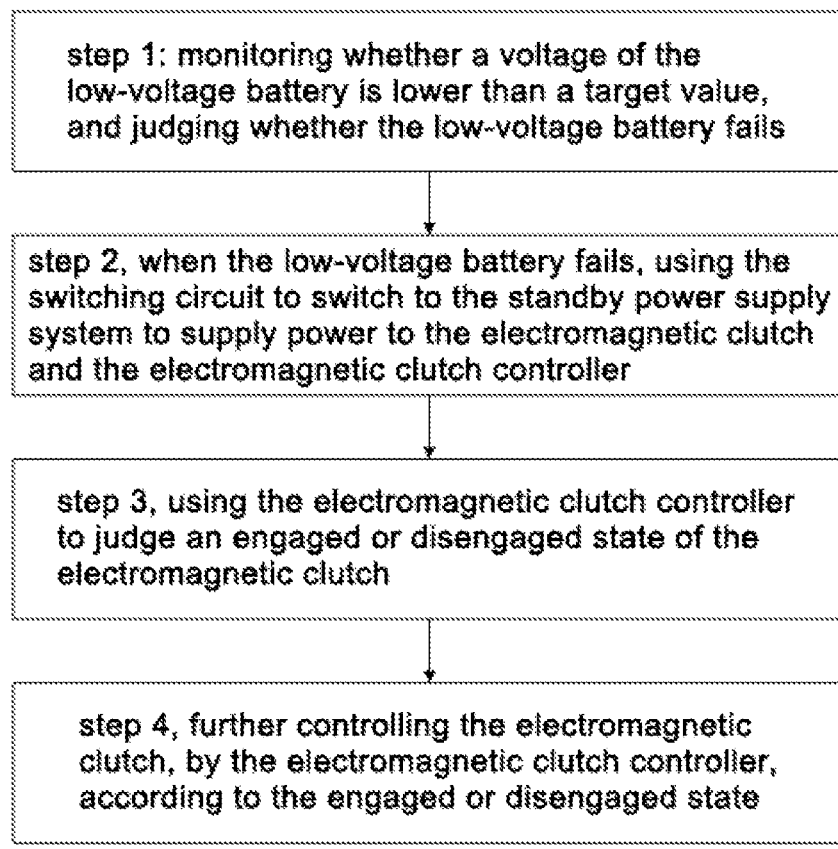
FIG. 1 shows implementation steps of a control method of electromagnetic clutch in a hybrid system according to an embodiment of the present disclosure.

In order to make the objectives, technical solutions, and advantages of the present application clearer, the technical solutions of the present application will be described clearly and completely in conjunction with specific embodiments of the present application and corresponding drawings. Obviously, the described embodiments are only part of the embodiments of the present application, rather than all of the embodiments. Based on the embodiments in the present application, all other embodiments obtained by a person of ordinary skill in the art without paying creative work shall fall within the protection scope of the present application.

The technical solutions according to various embodiments of the present disclosure will be described in detail below in conjunction with the accompanying drawings.

An embodiment of the present disclosure discloses a control method of an electromagnetic clutch in a hybrid power system. The hybrid power system further comprises an engine or motor, a motor, an electromagnetic clutch controller and a power supply system. The power supply system comprises a low-voltage battery, a standby power supply system and a switching circuit. The low-voltage battery is used to supply power to the electromagnetic clutch controller and electromagnetic clutch. The electromagnetic clutch is used to control connection of the motor to realize hybrid drive of the vehicle. The control method of electromagnetic clutch in hybrid power system specifically comprises the following steps:

step 1, monitoring in real time whether a voltage of the low-voltage battery is lower than a target value, and judging whether the low-voltage battery fails;

The target value is the lowest operation voltage value of the electromagnetic clutch controller and the electromagnetic clutch. When the voltage of the low-voltage battery is lower than the target value and the electromagnetic clutch controller and the electromagnetic clutch cannot work normally, it is judged that the low-voltage battery fails.

step 2, when the low-voltage battery fails, using the switching circuit to switch to the standby power supply system to supply power to the electromagnetic clutch and the electromagnetic clutch controller, so as to ensure the normal operation of the electromagnetic clutch controller and the engagement action of the electromagnetic clutch;

step 3, using the electromagnetic clutch controller to judge an engaged or disengaged state of the electromagnetic clutch; and step 4, further controlling the electromagnetic clutch, by the electromagnetic clutch controller, according to the engaged or disengaged state, to make the electromagnetic clutch in the engaged state until the power supply fault is eliminated.

In sum, in the control method of the electromagnetic clutch of the present embodiment, when the low-voltage battery power supply of the whole vehicle fails and the normal operation of the electromagnetic clutch controller and electromagnetic clutch cannot be ensured, the switching circuit switches to the standby power supply system to supply power to the electromagnetic clutch controller and electromagnetic clutch, which guarantees the use of electromagnetic clutch. Moreover, in the control method, the electromagnetic clutch is always engaged when the low-voltage battery fails, and thus the vehicle is driven by hybrid power, which ensures the safety and reliability of hybrid power system.

Figure 2:
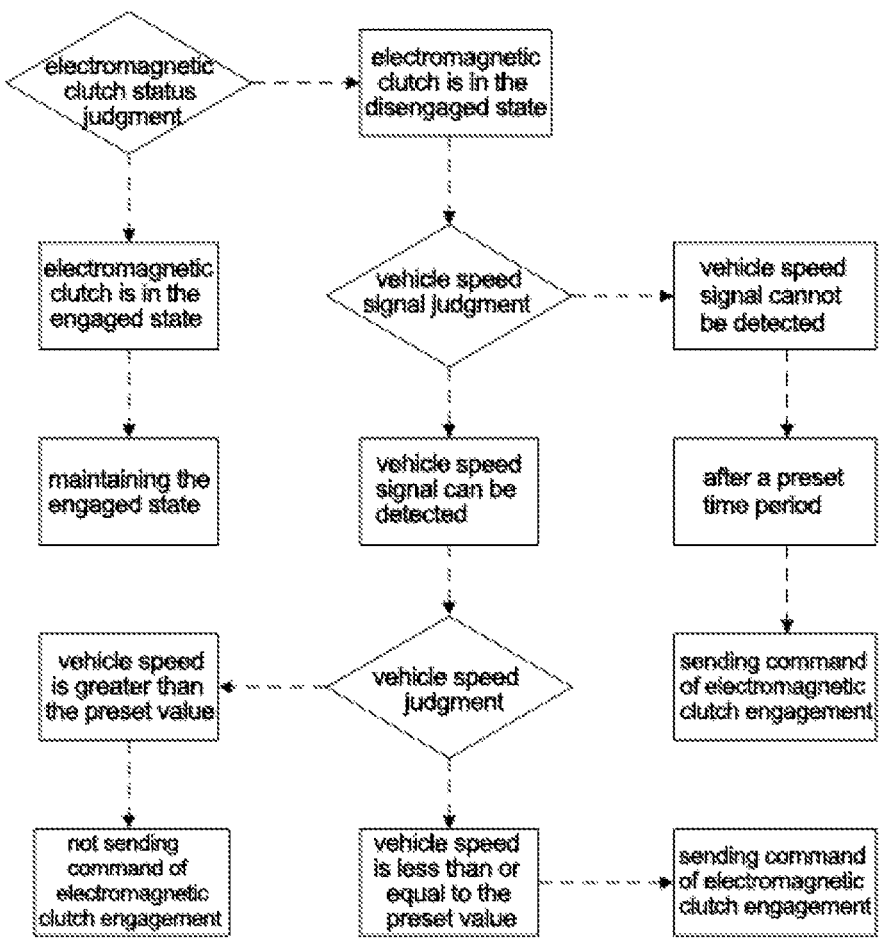
FIG. 2 shows the logic judgment in step 4 according to an embodiment of the present disclosure.

In an embodiment, as shown in FIG. 2, the step 4 specifically comprises:

when the electromagnetic clutch is in the engaged state, the electromagnetic clutch controller does not send a command of engagement, and the electromagnetic clutch maintains the engaged state;

when the electromagnetic clutch is in the disengaged state, it is judged whether the electromagnetic clutch controller needs to send a command of electromagnetic clutch engagement according to a vehicle speed signal.

Further, judging whether it is necessary to send the command of electromagnetic clutch engagement according to the vehicle speed signal comprises:

judging whether the vehicle speed signal can be detected;

if the vehicle speed signal can be detected, judging whether the electromagnetic clutch controller needs to send the command of electromagnetic clutch engagement according to the vehicle speed;

when the vehicle speed signal cannot be detected, the electromagnetic clutch controller sends the command of electromagnetic clutch engagement after a preset time period, and the electromagnetic clutch is engaged.

The preset time period is determined according to the working conditions of the power system and the conditions of the whole vehicle. The purpose of setting the preset time period is as follows. The vehicle speed cannot be determined due to the loss of vehicle speed signal. When the vehicle speed is too fast, if the electromagnetic clutch is engaged rashly, the power system may be damaged. After the preset time period lapses, the vehicle speed drops to a safe value, and the electromagnetic clutch controller sends the command of engaging the electromagnetic clutch to engage the electromagnetic clutch, which can ensure the safety and stability of the power system.

Further, judging whether it is necessary to send the command of electromagnetic clutch engagement according to the vehicle speed comprises:

when the vehicle speed is greater than a preset value, the electromagnetic clutch controller does not send the command of electromagnetic clutch engagement, thereby preventing the engagement of the electromagnetic clutch from causing damage to the power system when the vehicle speed is too fast;

when the vehicle speed is less than or equal to the preset value, the electromagnetic clutch controller sends the command of electromagnetic clutch engagement, so that the electromagnetic clutch is engaged to realize the hybrid drive of the vehicle.

For example, when the vehicle speed is greater than 5 km/h, the electromagnetic clutch controller does not send the command of electromagnetic clutch engagement, the electromagnetic clutch remains disengaged, and the vehicle is driven by a single power; when the vehicle speed is less than or equal to 5 km/h, the electromagnetic clutch controller sends the command of electromagnetic clutch engagement, and the electromagnetic clutch is engaged.

In an embodiment, the control method further comprises:

step 5, when a monitored voltage of the low-voltage battery is not lower than the target value, the switching circuit switches to the low-voltage battery to supply power to the electromagnetic clutch and the electromagnetic clutch controller, so that the electromagnetic clutch returns to normal operation. The voltage of the low-voltage battery may be lower than the target value for a period of time due to external reasons, such as low temperature or water inflow. After a period of time, the voltage of the low-voltage battery will return to the normal level. At this time, the switching circuit switches off the standby power supply system that supplies power to the electromagnetic clutch controller and the electromagnetic clutch, and restores the low-voltage battery to supply power to the electromagnetic clutch controller and the electromagnetic clutch.

In an embodiment, the electromagnetic clutch is a bi-stable electromagnetic split clutch. The bi-stable electromagnetic split clutch is powered on only when the electromagnetic clutch performs the engagement or disengagement action, and does not need to be powered on when it maintains the engagement and disengagement state.

Further, the bi-stable electromagnetic split clutch comprises a fixed member, a moving member and an elastic member. The fixed member maintains a fixed position in the axial direction of the electromagnetic clutch. The moving member is movable at least in the axial direction of the electromagnetic clutch, so that the electromagnetic clutch is in the suction or separation position respectively. The elastic member is provided with a preload to keep the fixed member in a position separated from the moving member.

The fixed member comprises a ferromagnetic element. Windings are disposed on the ferromagnetic element, and the windings energized to generate magnetic force.

The moving member comprises an armature disk, and a plurality of permanent magnetic steels are disposed on the armature disk.

When the windings are energized, the windings' magnetic field direction is same as the permanent magnetic field direction, the windings suck the permanent magnetic steels, and the armature disk overcomes the elastic force of the elastic member and moves to a position where it sucks the ferromagnetic element, so that the fixed member and the moving member realize transmission connection.

When the windings energized, magnetic field direction is opposite to the permanent magnetic field direction, the electromagnetic force generated by the windings reduces the suction force of the permanent magnetic steels, and the elastic force of the elastic member overcomes the suction force of the permanent magnetic steels and pushes the armature disk to a position where it is separated from the ferromagnetic element, so that the fixed member and the moving member are separated.

Figure 3:
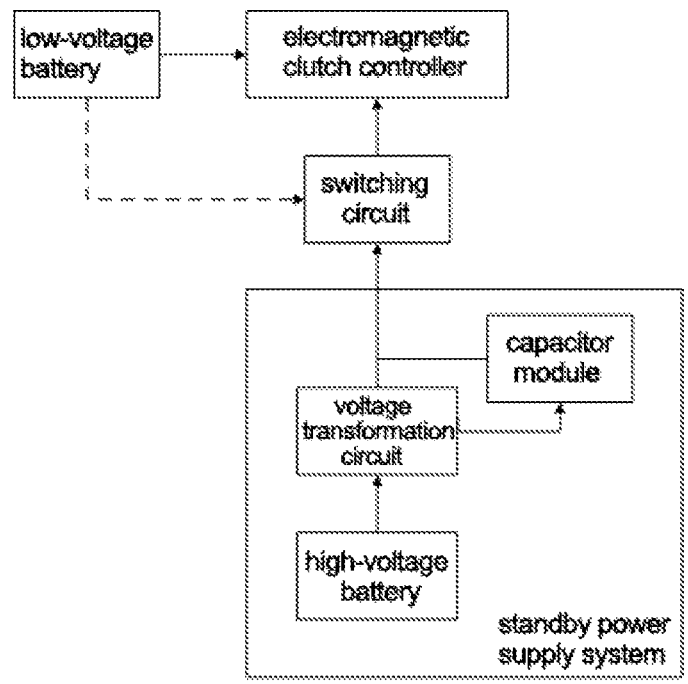
FIG. 3 shows the connection structure of a power supply system according to an embodiment of the present disclosure.

In a preferred embodiment, as shown in FIG. 3, the standby power supply system comprises a high-voltage battery, a voltage transformation circuit and a capacitor module. The high-voltage battery is the power battery of the vehicle.

The high-voltage battery is connected to the switching circuit through the voltage transformation circuit. One end of the capacitor module is connected to a connecting line between the voltage transformation circuit and the switching circuit, and the other end of the capacitor module is grounded.

When the low-voltage battery fails and the switching circuit switches to the standby power supply system to supply power to the electromagnetic clutch and the electromagnetic clutch controller, the high-voltage battery reduces voltage through the voltage transformation circuit to supply power to the electromagnetic clutch and the electromagnetic clutch controller. When both the low-voltage battery and the high-voltage battery fail, the capacitor module supplies power to the electromagnetic clutch and the electromagnetic clutch controller through the switching circuit. This standby power supply system provides double guarantee for the power supply of electromagnetic clutch and electromagnetic clutch controller, and has a greater safety factor.

The voltage transformation circuit is a flyback switching power supply circuit for transforming a high voltage to a low voltage. The input of the flyback switching power supply circuit is the vehicle's power battery, the output voltage is 15V, and the maximum power is 15 W. Under normal working conditions, as long as the high voltage of the power battery exists, the flyback switching power supply circuit is in work, transforms the high voltage to a low voltage, and outputs a constant voltage of 15V, so that the voltage actually received by the electromagnetic clutch and the electromagnetic clutch controller is ensured to match their applicable voltage.

In an embodiment, the capacitor module comprises a plurality of capacitor units connected in series. Each capacitor unit is connected in parallel with a voltage equalizing resistor. The main function of the voltage equalizing resistor is to ensure that the voltage on each capacitor is equal by using the voltage dividing principle. Since there are differences between capacitor units, it easily occurs that the voltage at each capacitor end is not equal, which is very likely to lead to capacitor breakdown. The voltage equalizing resistor connected in parallel can effectively prevent the occurrence of unequal voltage at each capacitor end.

Preferably, there are 10 capacitor units, the capacitor unit is a super capacitor unit of 3 V/3 F, the 10 capacitor units are connected in series, and the voltage borne by each capacitor unit during normal operation is 1.5V.

Figure 4:
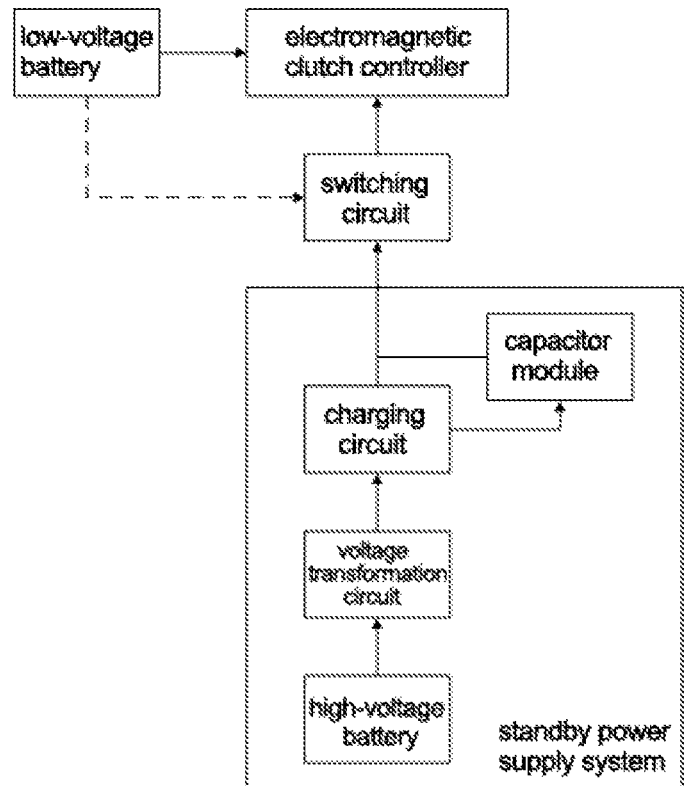
FIG. 4 shows the connection structure of a power supply system according to an embodiment of the present disclosure.

In an embodiment, as shown in FIG. 4, the standby power supply system further comprises a charging circuit.

The charging circuit is connected to the output end of the voltage transformation circuit, and one end of the capacitor module is connected to the connecting line between the charging circuit and the switching circuit. The electric energy in the high-voltage battery flows through the voltage transformation circuit to reduce the voltage, and then charges the capacitor units in the capacitor module through the charging circuit, so that the capacitor module is fully charged under normal conditions.

Further, the charging circuit comprises a charging resistor, a p-MOS transistor and a control circuit. The p-MOS transistor is connected in parallel with the charging resistor. The control circuit is connected to the p-MOS transistor and the capacitor module respectively. The function of the charging circuit is to limit the charging current of the capacitor. The charging resistor in the charging circuit is connected in series with the circuit, which can reduce the current in the circuit.

In an embodiment, the standby power supply system further comprises a voltage and temperature monitoring device.

The signal output end of the voltage and temperature monitoring device is connected to an MCU. The voltage and temperature monitoring device monitors the voltage and temperature of the capacitor module at any time, and transmits the monitored voltage and temperature signals to the MCU. The status information of the capacitor module can be obtained at any time from the MCU, thereby ensuring that the capacitor module is in normal working state.

An embodiment of the present disclosure discloses a hybrid power system, which is preferably a vehicle hybrid power system. The vehicle hybrid power system adopts the control method in any one of the above embodiments.

The above only describes the specific embodiments of the present disclosure. Under the above teaching of the present disclosure, a person skilled in the art can make other improvements or modifications on the basis of the above embodiments. A person skilled in the art should understand that the above specific description is only for better explaining the purpose of the present disclosure, and the protection scope of the present disclosure should be subject to the protection scope of the claims.

What is claimed is:

1. A control method of an electromagnetic clutch in a hybrid power system, the hybrid power system comprises an engine, a motor, the electromagnetic clutch, an electromagnetic clutch controller and a power supply system; the power supply system comprises a low-voltage battery, a standby power supply system and a switching circuit, the low-voltage battery is used to supply power to the electromagnetic clutch controller and the electromagnetic clutch, the electromagnetic clutch is used to control connection of the motor, wherein the control method specifically comprises the following steps:
step 1, monitoring whether a voltage of the low-voltage battery is lower than a target value, and determining that the low-voltage battery fails when the voltage of the low-voltage battery is lower than the target value;
step 2, when the low-voltage battery fails, using the switching circuit to switch to the standby power supply system to supply power to the electromagnetic clutch and the electromagnetic clutch controller;
step 3, using the electromagnetic clutch controller to judge an engaged or disengaged state of the electromagnetic clutch; and
step 4, further controlling the electromagnetic clutch, by the electromagnetic clutch controller, according to the engaged or disengaged state, to keep the electromagnetic clutch in the engaged state till a power supply fault is eliminated;
wherein the step 4 specifically comprises:
when the electromagnetic clutch is in the engaged state, maintaining the engaged state;
when the electromagnetic clutch is in the disengaged state, judging whether it is necessary to send a command of electromagnetic clutch engagement according to a vehicle speed signal;
wherein judging whether it is necessary to send the command of electromagnetic clutch engagement according to the vehicle speed signal comprises:
judging whether the vehicle speed signal can be detected;
if the vehicle speed signal can be detected, judging whether it is necessary to send the command of electromagnetic clutch engagement according to a vehicle speed;
when the vehicle speed signal cannot be detected, sending the command of electromagnetic clutch engagement after a preset time period.

2. The control method according to claim 1, wherein judging whether it is necessary to send the command of electromagnetic clutch engagement according to the vehicle speed comprises:
when the vehicle speed is greater than a preset value, not sending the command of electromagnetic clutch engagement;
when the vehicle speed is less than or equal to the preset value, sending the command of electromagnetic clutch engagement.

3. The control method according to claim 2, further comprising:
step 5, when a monitored voltage of the low-voltage battery is not lower than the target value, switching to the low-voltage battery, by the switching circuit, to supply power to the electromagnetic clutch and the electromagnetic clutch controller.

4. A hybrid power system using the control method according to claim 2.

5. The control method according to claim 1, further comprising:
step 5, when a monitored voltage of the low-voltage battery is not lower than the target value, switching to the low-voltage battery, by the switching circuit, to supply power to the electromagnetic clutch and the electromagnetic clutch controller.

6. A hybrid power system using the control method according to claim 5.

7. The control method according to claim 1, wherein the standby power supply system comprises a high-voltage battery, a voltage transformation circuit and a capacitor module;
the high-voltage battery is connected to the switching circuit through the voltage transformation circuit; one end of the capacitor module is connected to a connecting line between the voltage transformation circuit and the switching circuit, and the other end of the capacitor module is grounded;

the voltage transformation circuit is a flyback switching power supply circuit for transforming a high voltage to a low voltage.

8. The control method according to claim 7, wherein the standby power supply system further comprises a charging circuit;

the charging circuit is connected to an output end of the voltage transformation circuit, and one end of the capacitor module is connected to a connecting line between the charging circuit and the switching circuit.

9. A hybrid power system using the control method according to claim 7.

10. A hybrid power system using the control method according to claim 1.

* * * * *